United States Patent Office 3,266,527
Patented August 16, 1966

3,266,527
HOSE STRUCTURE
Edward J. Ross, Manitowoc, Wis., assignor to Imperial-Eastman Corporation, a corporation of Illinois
Filed Mar. 14, 1963, Ser. No. 265,236
6 Claims. (Cl. 138—125)

This invention relates to hose structures and in particular to a hose structure for use with fluids such as refrigerant fluids.

It is desirable to provide flexible hose structures for use in refrigeration apparatuses, such as in automobile refrigeration apparatuses. A problem arises, however, in the use of such applications of the conventional hose structures, in that substantial leakage of fluids such as Freon refrigerant and water occurs through the hose structure wall. More specifically, in conventional hose structures utilizing inner cores of polymeric material, such as nylon, polyvinyl chloride and the like, and outer jackets of similar polymeric material have been found to have substantial permeability to Freon 22, water vapor, and other similar highly permeating materials. The defect of the known hose structures has effectively precluded their successful utilization in refrigeration apparatuses and the like.

The present invention comprehends a new and improved hose structure which, while maintaining substantially all of the flexibility of the known hose structures, is highly impervious to such normally highly permeating fluids.

Thus, a principal object of the present invention is the provision of a new and improved hose structure.

Another object of the invention is the provision of such a new and improved hose structure arranged to have low permeability relative to highly permeable materials such as refrigerant fluids, water vapor, and the like.

A further object of the invention is the provision of such a hose structure including a tubular core of flexible material, a tubular sheath of plastic material having a low permeability to Freon refrigerants and water concentrically constrictively surrounding the core, a flexible layer of reinforcing braid concentrically surrounding the sheath, and a flexible protective tubular jacket concentrically surrounding the braid layer.

Still another object of the invention is the provision of such a hose structure wherein the braid constrictively surrounds the sheath.

Yet another object of the invention is the provision of such a hose structure wherein at least one pair of concentrically adjacent ones of said hose structure elements are bonded together.

Figure 1:
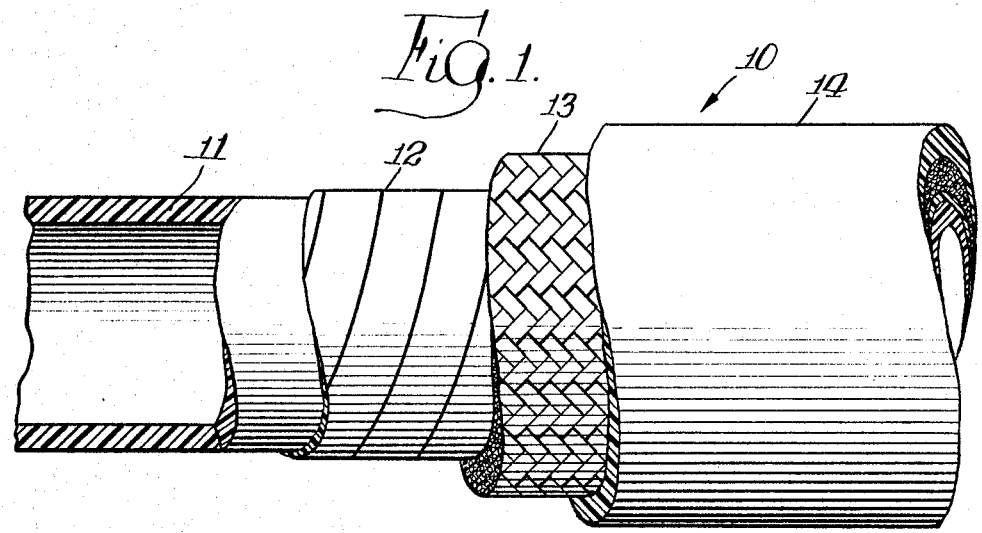
Figure 2:
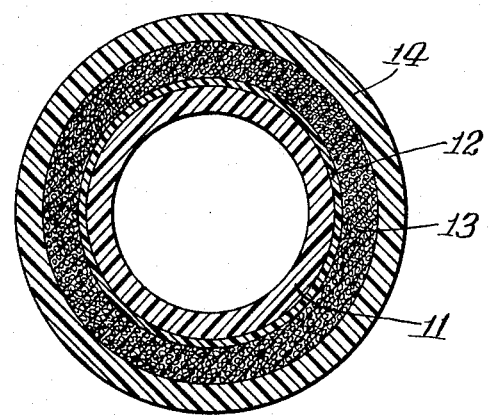

Other objects and advantages of the invention will be apparent from the following description taken in connection with the accompanying drawing wherein:

FIGURE 1 is a fragmentary side elevation of a hose structure embodying the invention with portions broken away to illustrate the layered structure thereof; and FIGURE 2 is a transverse section of the hose structure.

In the exemplary embodiment of the invention as disclosed in the drawing, a hose structure generally designated 10 is shown to comprise a tubular inner core 11, a nonpermeable tubular sheath 12 concentrically surrounding the core 11, a tubular braid layer 13 concentrically surrounding the sheath 12, and an outer jacket 14 concentrically surrounding the braid layer 13.

More specifically, hose structure 10 is arranged to carry highly permeating materials, such as Freon 22 refrigerant, and, thus, is adapted for use in refrigerant systems. As indicated briefly above, it has been found that Freon 22, particularly at the relatively high pressure at which this refrigerant is maintained in such refrigeration apparatuses, for example at 600 p.s.i., tends to diffuse readily through the conventional flexible hose structures such as formed of nylon cores and nylon jackets. Further, such known hose structures tend to pass water vapor freely therethrough, and, thus, are particularly disadvantageous in refrigerant systems where it is desirable to maintain the system substantially free of water at all times.

The tubular core 11 of hose structure 10 herein may be formed of a suitable flexible plastic material such as a polymeric plastic material. Illustratively, the core may be formed of a polyamide, a polyolefin, or a polyvinyl chloride material. The core may be formed as by extruding.

Sheath 12 is preferably formed of a suitable impervious plastic material such as polyethylene terephthalate, polyvinylidene chloride-vinyl chloride copolymer, FEP fluorocarbon and the like. The sheath is preferably formed as a tubular element having a wall thickness of from approximately .0005 inch to approximately .02 inch. The sheath is preferably formed by spiral winding a strip of the material to produce a tube having a diameter slightly larger than the outer diameter of core 11. The sheath material as disclosed above comprises a heat shrinkable material which permits facilitated positive association thereof with the tubular core 11. More specifically, the sheath may be installed on the core by simply placing the sheath over the core and then applying sufficient heat, illustratively, heat at 212° F., to bring the sheath tightly down onto the core.

The braid layer 13 may be formed of any suitable braiding material such as fiber, plastic material, or wire, and is applied under sufficient tension to provide an additional retention of the sheath 12 on the core 11. Additionally, the braid layer 13 provides improved strength of the hose structure for extended life thereof.

The outer jacket 14 preferably comprises an abrasion resistant material adapted for use at relatively high temperatures. Examples of such jacket material are polyamide, polyolefin, polyvinyl chloride, and polyurethane polymeric materials. The jacket 14 and braid 13 are successively installed over the assembled core 11 and sheath 12 structure after the assembled core and sheath structure are cooled. The respective layers, or hose structure elements, may be further bonded one to another by suitable adhesive materials such as cement, plastic solubilizing agents, etc.

An example of such a hose structure 10 which has been found to possess superior low permeability characteristics comprises one wherein the core is formed of nylon-11 and the sheath is formed of polyethylene terephthalate (commercially known as "Mylar" film) having a thickness of .004 inch. The braid layer 13 is formed of polyethylene terephthalate and wound tightly in an overlapping braid, as shown in FIGURE 1. The outer jacket 14 is formed of polyurethane. Such a hose structure has been found to have effectively minimum permeability relative to refrigerant fluids, such as Freon 12 and Freon 22, minimum permeability to water vapor, capability of operating at relatively high temperatures, such as up to 250° F. to 300° F., and effectively maximum flexibility.

While I have shown and described one embodiment of my invention, it is to be understood that it is capable of many modifications. Changes, therefore, in the construction and arrangement may be made without departing from the spirit and scope of the invention as defined in the appended claims.

What is claimed is:

1. A hose structure comprising: a tubular core of flexible material; a helically wound strip of substantially impervious plastic material concentrically constrictively surrounding said core, the turns of said helically wound strip sealingly interengaging as a result of the constriction of the strip material to define a substantially impervious sheath; a flexible layer of reinforcing braid concentrically surrounding said sheath; and a flexible protective tubular jacket concentrically surrounding said braid layer.

2. The hose structure of claim 1 wherein said sheath is formed of a heat shrinkable material.

3. The hose structure of claim 1 wherein said sheath is formed of polyethylene terephthalate polyester.

4. The hose structure of claim 1 wherein said sheath is formed of a film having a thickness in the range of from approximately .0005 inch to approximately .02 inch.

5. The hose structure of claim 1 including bonding material bonding at least one pair of concentrically adjacent ones of said hose structure elements together.

6. A hose structure comprising: a tubular core of nylon-11; a tubular substantially impervious sheath of polyethylene terephthalate concentrically constrictively surrounding said core; a flexible layer of reinforcing braid concentrically surrounding said sheath; and a flexible protective tubular jacket concentrically surrounding said braid layer.

References Cited by the Examiner

UNITED STATES PATENTS

| | | | |
|---|---|---|---|
| 1,361,001 | 12/1920 | Blaisdell | 156—86 |
| 2,171,764 | 9/1939 | Ramsdell | 156—86 |
| 2,564,602 | 8/1951 | Hurst | 138—125 |
| 2,652,093 | 9/1953 | Burton | 138—137 |
| 2,690,769 | 10/1954 | Brown | 138—125 |
| 2,800,145 | 7/1957 | Peirls et al. | 138—137 X |
| 2,855,975 | 10/1958 | Ritchie et al. | 138—125 X |
| 3,037,529 | 6/1962 | Hancik | 138—141 X |
| 3,042,737 | 7/1962 | Brumbach et al. | 138—125 X |
| 3,062,241 | 11/1962 | Brumbach | 138—125 |

LAVERNE D. GEIGER, *Primary Examiner.*

EDWARD V. BENHAM, *Examiner.*

C. HOUCK, *Assistant Examiner.*